UNITED STATES PATENT OFFICE.

OSCAR JONAS, OF GRIESHEIM, GERMANY, ASSIGNOR TO CHEMISCHE FABRIK GRIESHEIM ELECTRON, OF FRANKFORT-ON-THE-MAIN, GERMANY, A CORPORATION OF GERMANY.

REMOVAL OF ARSENIC FROM LIQUIDS AND GASES.

No. 891,775.  Specification of Letters Patent.  Patented June 23, 1908.

Application filed January 25, 1907. Serial No. 354,157.

*To all whom it may concern:*

Be it known that I, OSCAR JONAS, a subject of the German Emperor, and a resident of Griesheim-on-the-Main, Germany, have invented certain new and useful Improvements in the Removal of Arsenic from Liquids and Gases, of which the following is a specification.

This invention relates to the removal of arsenic from liquids and gases and especially from sulfuric acid, hydrochloric acid, fluorhydric acid and gases containing sulfur dioxid.

I have found that a very efficient and satisfactory removal of the arsenic (which is present in the form of chlorid or fluorid) is effected by treating the liquids or gases with pure benzene derivatives which will not act as a solvent of nor have a chemical action on the fluid to be purified, viz. pure benzol, toluol, chlorbenzols, chlortoluols, nitrobenzol and nitrochlorbenzols.

The process may be performed as follows but the invention is not limited to the details hereinafter given. Let it be presumed that sulfuric acid of 60° Baumé containing 0.1 per cent. of arsenic is to be treated for the removal of the arsenic. The said acid is placed in a stirring vessel with six per mille of hydrochloric acid of 24° Baumé or with the equivalent amount of fluorhydric acid. 100 grams of benzene are then added and the whole is thoroughly stirred for a few minutes. The mixture is then allowed to stand till it becomes clear and the benzene which contains the arsenic, is decanted. In order to regenerate the benzene after it has been saturated with arsenic, it is treated with about double the quantity of water, whereby the benzene is entirely deprived of arsenious compounds. The sulfuric acid from which the arsenic has thus been removed is not discolored.

Benzene, or di-chlor-benzene, possesses over oil the advantage that it is not necessary to keep it at a low temperature.

If arsenic is to be removed from gases, it is preferable to use di-chlor-benzene, especially on account of the high tension of the vapor of di-chlor-benzene. If the gases be caused to pass through towers in a direction opposite to that in which the solvent passes, a perfect removal of the arsenic is obtained. The di-chlor-benzene can be deprived completely of its arsenic by washing it with water, as in the case of the benzene.

The following account of operations performed by me will demonstrate the fact that the bodies used in accordance with this invention, for extracting arsenic possesses a greater efficiency than oils which have been used previously for the same object. 500 grams hydrochloric acid of 24° Baumé, containing 0.11 grams of arsenic per 100 grams of acid were in one instance mixed with 50 grams of petroleum, and in another instance, with 50 grams of benzene, the mixture being, in both cases, similarly shaken for two minutes. After shaking with petroleum, the acid, which was then of a brown color still contained 0.08 grams of arsenic, while the acid shaken with benzene contained only 0.028 grams of arsenic and its color had not altered. Thus in using petroleum only 28 per cent. of the arsenic was extracted, whereas with benzene 75 per cent. of arsenic was extracted. A comparative trial was made in a similar manner on concentrated sulfuric acid containing 0.1 per cent. of arsenic, and the result was that on shaking only once, the petroleum removed 79 per cent. of the arsenic, while under similar conditions benzene removed 98 per cent. In the first case the acid turned black, while in the second case it remained colorless.

I claim

The herein described process of effecting the removal of arsenic from fluids, in which the arsenic is in the form of binary haloid compound, consisting in treating the fluid with a benzene derivative which will not act as a solvent of nor have a chemical action on the fluid.

In testimony whereof I have signed my name to this specification in the presence of two subscribing witnesses.

OSCAR JONAS.

Witnesses:
FRANZ HASSLACHER,
ERWIN DIPPEL.